United States Patent
Aoyama et al.

(10) Patent No.: US 7,148,790 B2
(45) Date of Patent: Dec. 12, 2006

(54) SYSTEM FOR CONTROLLING A VALET MODE OF A VEHICLE

(75) Inventors: Keiichi Aoyama, Novi, MI (US); Thomas Keeling, Redford, MI (US); Justin McBride, West Bloomfield, MI (US); Akio Nakano, West Bloomfield, MI (US); Michael Wiegand, Birmingham, MI (US)

(73) Assignee: Denso International America, Inc., Southfield, MI (US)

( * ) Notice: Subject to any disclaimer, the term of this patent is extended or adjusted under 35 U.S.C. 154(b) by 297 days.

(21) Appl. No.: 10/789,910

(22) Filed: Feb. 27, 2004

(65) Prior Publication Data

US 2005/0190039 A1 Sep. 1, 2005

(51) Int. Cl.
*B60Q 1/00* (2006.01)

(52) U.S. Cl. .............. 340/425.5; 340/426.13; 340/426.16; 340/426.17; 340/426.35; 341/176; 307/10.5; 180/287

(58) Field of Classification Search ........... 340/426.13, 340/426.11, 426.16, 426.17, 426.35; 341/176; 307/10.5; 180/287
See application file for complete search history.

(56) References Cited

U.S. PATENT DOCUMENTS

| 5,959,540 | A | * | 9/1999 | Walter ................. 340/5.64 |
| 6,772,061 | B1 | | 8/2004 | Berthiaume et al. |
| 2004/0021550 | A1 | | 2/2004 | Ohtaki et al. |
| 2004/0046452 | A1 | | 3/2004 | Suyama et al. |
| 2004/0135669 | A1 | | 7/2004 | Muench-Casanova |
| 2004/0135670 | A1 | | 7/2004 | Guba |

\* cited by examiner

*Primary Examiner*—Daryl C Pope
(74) *Attorney, Agent, or Firm*—Harness, Dickey & Pierce, PLC

(57) ABSTRACT

A remote control device for controlling a reduced operational mode of a vehicle includes a portable communication device operable to communicate with the vehicle. A detachable component is selectively coupled to the communication device. The communication device is operable to initiate a reduced operational mode for the vehicle upon detachment of the detachable component from the communication device. The portable communication device detects the input in the attached position and initiates a normal operational mode upon the detection. Detachment of the detachable component cause an input voltage to change on the portable device. The reduced operational mode includes inhibiting access to predetermined storage compartments in the vehicle such as a vehicle trunk or glove box. Vehicle speed and RPM are limited in the reduced operational mode.

18 Claims, 3 Drawing Sheets

SYSTEM FOR CONTROLLING A VALET MODE OF A VEHICLE

FIELD OF THE INVENTION

The present invention relates to initiating a valet mode in a vehicle and more particularly to controlling the vehicle for operation between a normal operational mode and a reduced operational mode based on a user input.

BACKGROUND OF THE INVENTION

Occasionally, a vehicle owner must leave his or her vehicle with an unknown third party. In many cases, it is necessary to allow the third party to operate the vehicle without the supervision of the vehicle owner. Such instances may include leaving the vehicle with valet personnel, an oil change or tire repair technician, or body shop employee for example.

Although it may be necessary to provide the third party access to the vehicle, usually it is not necessary for the third party to assume complete operational control of the entire vehicle. For example, the unknown person would not necessarily need full function capabilities of the vehicle powertrain, e.g. full RPM and high speed. In addition, it is not necessary for the third party to access storage compartments of the vehicle.

When it is deemed that the third party operator of the vehicle does not need certain functionality of the vehicle, such as those above, it is desirable to program or otherwise set the vehicle to operate in a reduced operational mode. Accordingly, once the third party is finished with the vehicle, it is desirable to quickly reset the vehicle to operate under normal operational capabilities. Although some vehicles are equipped with a valet mode function, a need still exists in the art to improve functionality and ease of use of such a feature.

SUMMARY OF THE INVENTION

A remote control device for controlling a reduced operational mode of a vehicle includes a portable communication device operable to communicate with the vehicle. A detachable component is selectively coupled to the communication device. The communication device is operable to initiate a reduced operational mode for the vehicle upon detachment of the detachable component from the communication device.

According to other features, the detachable component provides an input to the portable communication device in an attached position. The portable communication device detects the input in the attached position and initiates a normal operational mode upon the detection. The input includes an electrical resistance. Detachment of the detachable component causes an input voltage to change on the portable device. The reduced operational mode includes inhibiting access to predetermined storage compartments in the vehicle such as a vehicle trunk or glove box. Vehicle speed and RPM are limited in the reduced operational mode. The detachable component includes a key operable to provide access and operation of the vehicle.

A method for controlling a reduced operational mode of a vehicle includes communicating a first signal from a portable communication device based on the presence of a detachable component coupled to the portable communication device. A second signal is communicated from the portable communication device based on the absence of the detachable component from the portable communication device. At least one of the first and second signals are received by a receiver associated with the vehicle. The vehicle is operated in a normal operational mode based on the receiver receiving the first signal. The vehicle is operated in a reduced operational mode based on the receiver receiving the second signal.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
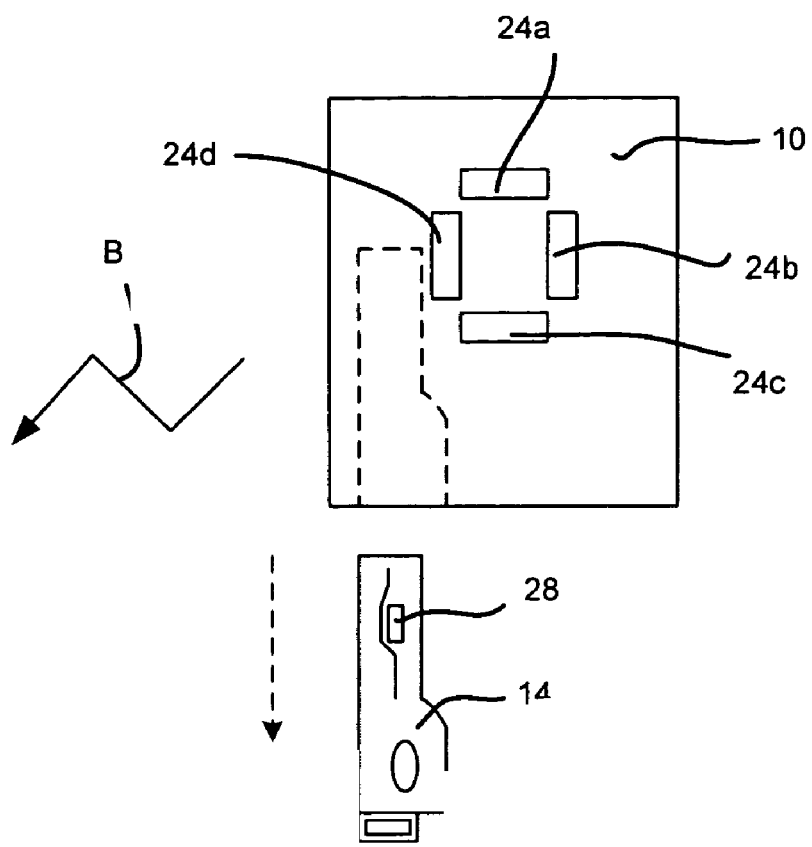
FIG. 1 is a front view of an exemplary portable communication device having a detachable component according to the present teachings.
Figure 2:
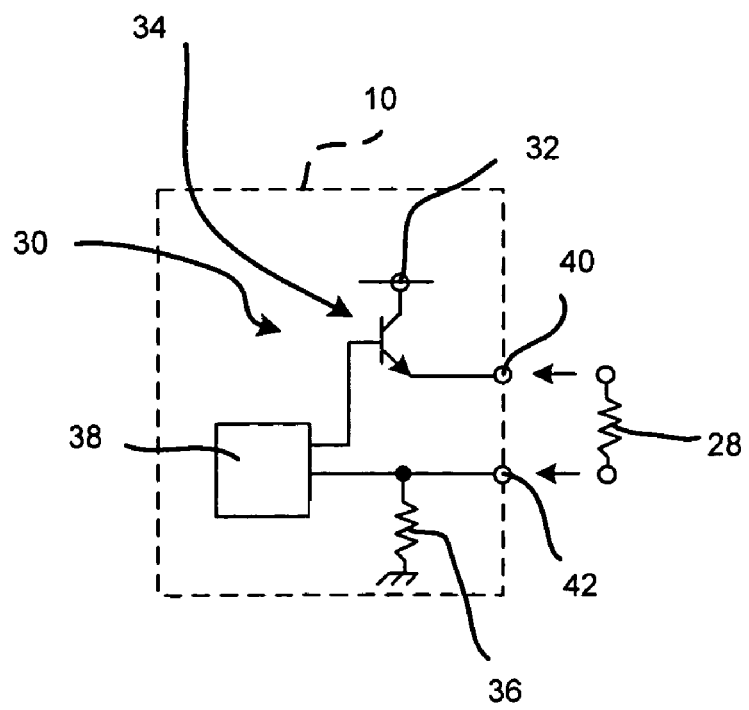
FIG. 2 is a schematic view of an exemplary circuit associated with the communication device of FIG. 1.
Figure 3:
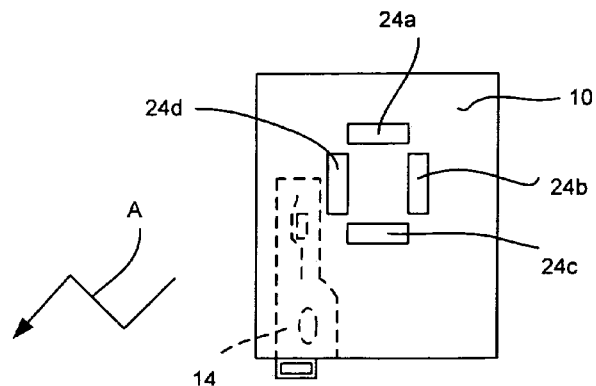
FIG. 3 is a front view of the portable communication device of FIG. 1 shown with the detachable component in an attached position.

With initial reference to FIGS. 1 and 2, an input device or portable communication device 10 adapted to receive a detachable component 14 are shown. As will be described in greater detail, the portable communication device 10 is operable to communicate a first signal A to a vehicle 20 (FIGS. 3 and 4) based on the detection of the detachable component 14 in an attached position (FIG. 3) and a second signal B based on the detection of the detachable component 14 removed from the communication device 10 (FIG. 1). The first signal A initiates a normal vehicle operational mode and the second signal B initiates a reduced operational mode or valet mode as referred to herein.

The portable communication device 10 generally includes a plurality of input buttons 24a–24d configured thereon. The input buttons 24a–24d may be adapted to initiate vehicle lock/unlock functions, trunk release, or a panic feature for example. It is appreciated that the configuration of the input buttons 24a–24d is merely exemplary and the portable communication device 10 may have fewer or less input buttons 24a–24d configured to control alternate functions.

The detachable component 14 may take the shape and function of a vehicle key. In this way, the key may be detached from the portable communication device 10 thereby initiating a reduced operational mode. Once the reduced operational mode is initiated, the key 14, or the portable communication device, may be passed to a third party user deemed to have access to the vehicle, but in a reduced capacity. An example user may include valet personnel or any other person identified by the vehicle owner to only need limited operational capacity of the vehicle 20.

If the third party user has the key 14, they may gain access to the vehicle 20 by way of a conventional vehicle door lock and start the vehicle with the key 14 or by other methods such as a push button or switch for example. Similarly, if the third party user has the portable communication device 10, they may gain access to the vehicle 20 by way of the input buttons 24a–24d. The third party user may then start the vehicle 20 by a push button or switch for example.

The detachable component 14 generally includes a device or resistor 28 for providing an input to an electrical circuit 30 (FIG. 2) configured in the portable communication device 10. The electrical circuit 30 in the portable communication device 10 includes a voltage source 32, a transistor 34, a ground resistor 36 and an integrated circuit 38. When the resistor 28 on the detachable component 14 is installed into the portable communication device 10, a bridge is created between opposing nodes 40 and 42, respectively. In this way, a known value is communicated to the integrated circuit 38 based on the input voltage provided by the voltage source 32. As a result, the integrated circuit 38 can detect the presence of the detachable component 14 based on an input value received by the integrated circuit 38. It is appreciated that the integrated circuit 38 may be configured to determine a voltage, current or any other variable. In addition, skilled artisans will readily appreciate that other circuit configurations may be employed.

Figure 4:
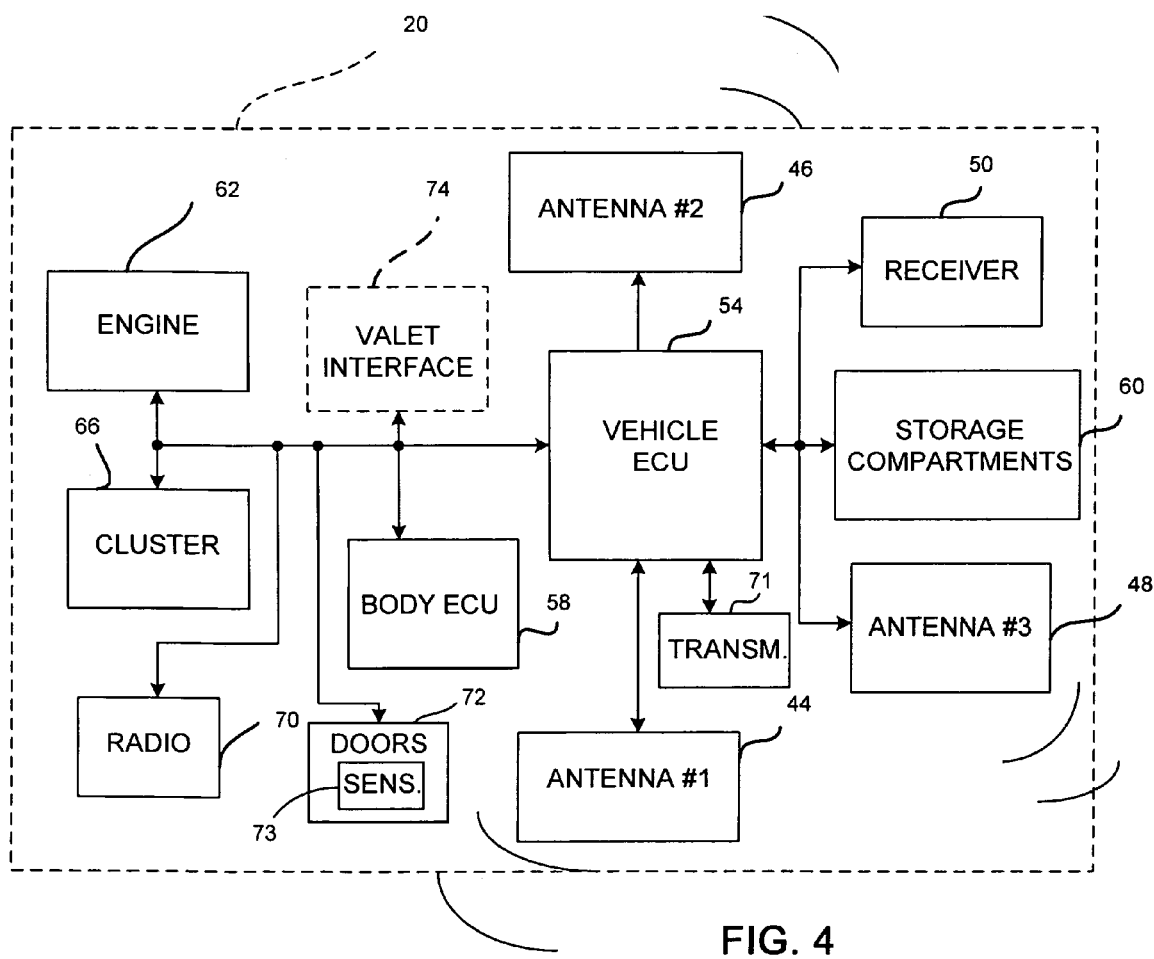
FIG. 4 is a block diagram of a vehicle adapted to initiate a reduced operational mode.

Turning now to FIG. 4, the vehicle 20 configured to communicate with the portable communication device 14 will be described. The vehicle 20 includes a plurality of antennas 44, 46 and 48 for receiving the first and second signals A and B generated by the portable communication device 10. The antennas 44, 46 and 48 may be in any suitable location on the vehicle 20 such as, but not limited to, in a vehicle door, door handle, bumper, window, and roof (not specifically shown), or in a location inside the vehicle for example. It is appreciated that more or less antennas may be implemented. The antennas 44, 46 and 48 communicate a signal to a receiver 50. The receiver 50 communicates a signal to a vehicle electronic control unit (ECU) 54 based on one of the first and second signals A or B, respectively, being communicated from the portable communication device 14. The vehicle ECU 54 is operable to control various components of the vehicle 20 in a reduced operational mode based on the second signal B being generated by the portable communication device 14.

The vehicle 20 further comprises a body electronic control unit (ECU) 58 for communicating with storage compartments 60 and controlling access to the storage compartments 60 upon indication from the vehicle ECU 54 that a second signal B has been received. The storage compartments 60 may include a vehicle glove box, center console storage compartment, trunk, fuel tank or any other compartment for example. The vehicle ECU 54 further communicates with an engine 62 through an engine ECU (not shown) to limit engine RPM and/or limit overall vehicle speed in the valet mode.

The vehicle ECU 54 communicates with a cluster 66 or other display device such as a navigation system to display the operating mode currently selected (e.g. valet mode, or normal mode). The vehicle ECU 54 further communicates with a vehicle audio system or radio 70 to limit or inhibit operation thereof during the valet mode. It is appreciated that the vehicle ECU 54 may be configured to communicate with other vehicle components to further enhance a valet mode. The vehicle ECU 54, or other component, may be adapted to record vehicle information while in valet mode, as is well known. Such vehicle information may include, but is not limited to, vehicle mileage, vehicle run time, fuel consumption or any other recordable event or condition. This information may be displayed on the cluster 66 upon reentry into the normal mode, or upon another user input.

It is also contemplated that the portable communication device 10 may incorporate keyless operational features as set forth in commonly owned U.S. patent application Ser. No. 10/730,091 entitled "Vehicle Electronic Key System", the contents of which are incorporated herein by reference. Specifically, an interrogational signal is transmitted by a transmitter 71 at predetermined intervals from the vehicle 20. The portable communication device 10 transmits an ID code to the receiver 50 of the vehicle 20 in response to the interrogational signal. The ID code transmitted from the portable communication device 10 is checked in the vehicle 20 whether the ID code corresponds to a registered ID code of the vehicle 20. When the ID code of the portable communication device 10 corresponds to the registered ID code, ECU 54 of the vehicle 20 sets doors 72 to an unlock-standby state. Then, when the user having the portable communication device 10 touches one of the doors 72 in the unlock-standby state, the doors 72 are unlocked in response to a detection of the touch via a touch sensor 73.

It is contemplated that the ECU 54 of the vehicle would default to valet mode operation based on an operator gaining access to the vehicle solely by key 14 and starting the vehicle with the key 14 or other methods as discussed herein. Such a scenario may occur whereby neither signal A nor signal B is received by the receiver 50. This may be the case when the key 14 is removed from the portable communication device 10 at a distance out of range from the antennas 44, 46 and 48.

With continued reference to FIG. 4, a vehicle 20 incorporating an alternate input device or valet interface 74 according to other features will be described. The valet interface 74 may comprise a security interface device adapted to receive a user generated input. The user generated input may include, but is not limited to, a numerical or alpha-numeric code, or input switch or button. In addition, a physical feature input such as an eye scan, fingerprint scan or voice input or any other user generated input may be used. The valet interface 74 may be adapted to initiate a valet mode, such as one according to the limited operational features as described above, or return to a normal operating mode upon verification of a correct user generated input.

The valet interface 74 may be incorporated into a vehicle navigation system (not specifically shown) or other on-board electronics, or may comprise an interface accessible from the exterior of the vehicle 20 such as a keypad on the vehicle door for example. It is also appreciated that the valet interface may be incorporated into a portable communication device such as a cell phone or PDA for example, the portable communication device operable to communicate a desired transition between a normal operational mode and a valet mode.

Figure 5:
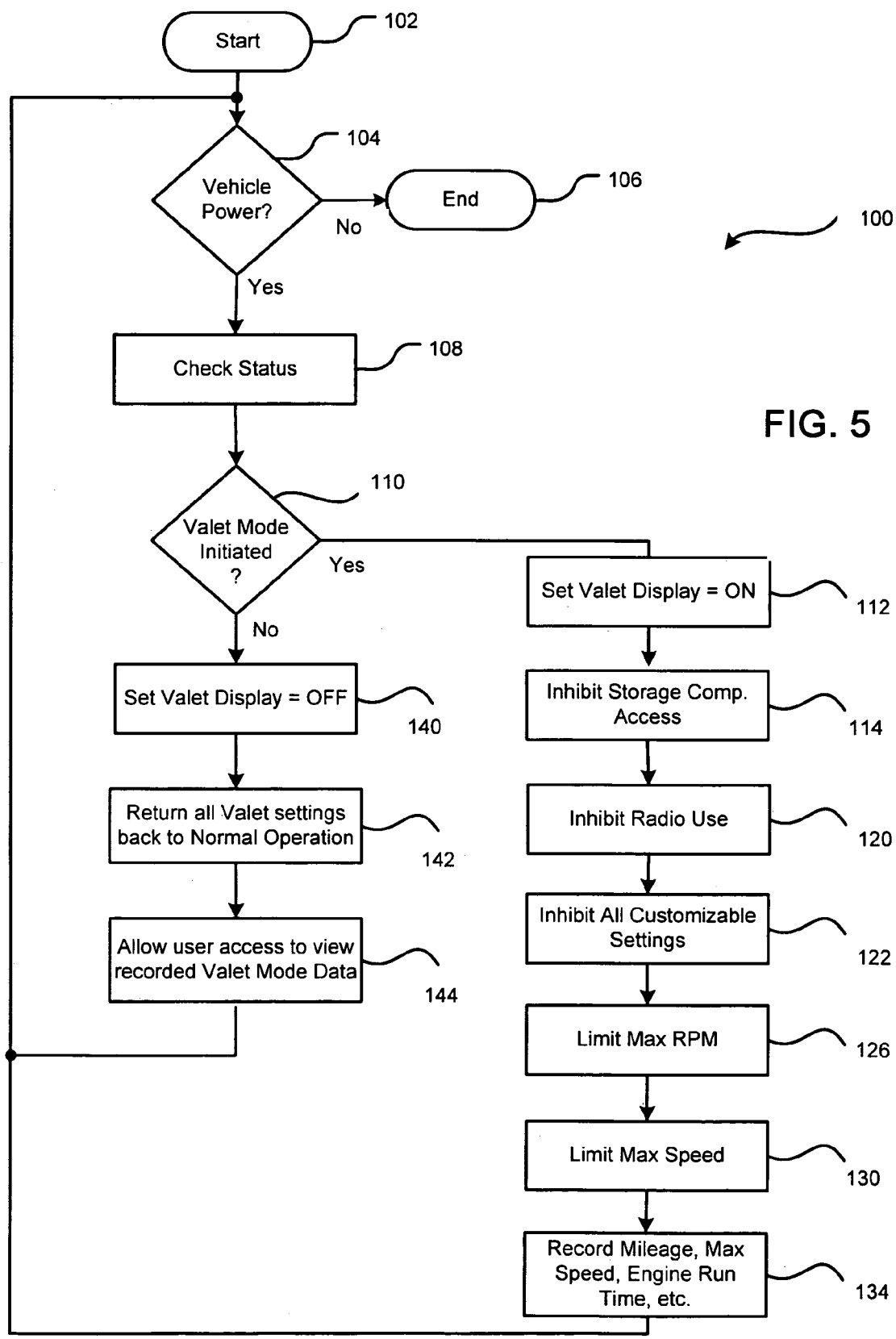
FIG. 5 is a functional block diagram of a control system for operating a vehicle in a reduced operational mode according to the present teachings.

Turning now to FIG. 5, an exemplary method for operating the vehicle 20 in a reduced operational mode is shown and generally identified at reference 100. It is understood that only the relevant steps of the methodology are discussed in relation to FIG. 5 and that other software-implemented instructions may be needed to control and manage the overall operation of the system. Control begins in step 102. In step 104, control determines if the vehicle has power. If the vehicle does not have power, control ends in step 106. If the vehicle has power, control checks status in step 108.

Control may check status by transmitting an interrogational signal by the transmitter 71 at predetermined intervals and checking the ID code transmitted by the portable communication device 10 as described above. Based on the status, control determines if the valet mode has been initiated in step 110.

If valet mode has been initiated, control sets a visual identifier in the cluster 66 that valet mode has been initiated in step 112. In step 114, control inhibits access to the storage compartments 60. In step 120, control inhibits the operation of the radio 70. In step 122, control inhibits customizable settings. The customizable settings may include, seat memory, radio preset functions, mirror memory and any other user customizable settings.

In step 126, control limits the maximum RPM of the engine 62. In step 130, control limits the maximum speed of the vehicle 20. In step 134, control records predetermined data such as mileage, maximum speed, engine run time and other recordable vehicle data. Control then loops to step 104. It is readily appreciated that while steps 112 through 134 have been described in relation to initiating valet mode, any one or any combination of these steps may be performed. Likewise, additional steps may be performed.

If control determines that the valet mode has not been initiated in step 110, control sets a visual identifier in the cluster 66 that normal vehicle operation has been initiated in step 140. In step 142, all limited operational functions performed while in valet mode are returned to normal operational mode. In step 144, control displays the recordable data for the user. Control then loops to step 104.

Those skilled in the art can now appreciate from the foregoing description that the broad teachings of the present invention can be implemented in a variety of forms. For example, some components of the vehicle 20 are represented as unique devices. It is appreciated that some components may be integrated. For example, the antennas 44, 46 and 48, the receiver 50 and the transmitter 71, may in any combination be incorporated into the vehicle ECU 54. Therefore, while this invention has been described in connection with particular examples thereof, the true scope of the invention should not be so limited since other modifications will become apparent to the skilled practitioner upon a study of the drawings, the specification and the following claims.

What is claimed is:

1. A remote control device for controlling a reduced operational mode of a vehicle comprising:
   a portable communication device operable to communicate with the vehicle; and
   a detachable component selectively coupled to said communication device, said communication device operable to initiate a reduced operational mode for the vehicle upon detachment of the detachable component from said communication device, wherein said reduced operational mode includes limiting vehicle RPM and vehicle speed.

2. The remote control device of claim 1 wherein said detachable component provides an input to said portable communication device in an attached position.

3. The remote control device of claim 2 wherein said portable communication device detects said input in said attached position and initiates a normal operational mode upon said detection.

4. The remote control device of claim 3 wherein said input includes an electrical resistance.

5. The remote control device of claim 4 wherein said detachment of said detachable component causes an input voltage to change on said portable device.

6. The remote control device of claim 1 wherein said reduced operational mode includes inhibiting access to predetermined storage compartments in the vehicle.

7. The remote control device of claim 6 wherein said predetermined storage compartments includes at least one of a trunk and a glove box.

8. The remote control device of claim 1 wherein said reduced operational mode includes limiting.

9. The remote control device of claim 1 wherein said detachable component includes a key, said key operable to provide access to and operation of the vehicle.

10. The remote control device of claim 4 wherein said input is in the form of a chip resistor embedded in a key.

11. A remote control device for controlling a reduced operational mode of a vehicle comprising:
    a vehicle control unit;
    a receiver operable to communicate a signal to said control unit;
    a portable communication device operable to communicate with said receiver; and
    a detachable component selectively coupled to said communication device, said communication device operable to communicate a request signal to said receiver upon removal of said detachable component from said communication device, said request signal initiating said control unit to operate the vehicle in a reduced operational mode, wherein said reduced operational mode includes limiting vehicle RPM and vehicle speed.

12. The remote control device of claim 11 wherein said detachable component provides an input to said portable communication device in an attached position.

13. The remote control device of claim 12 wherein said portable communication device detects said input in said attached position and initiates a normal operational mode upon said detection.

14. The remote control device of claim 13 wherein said input includes an electrical resistance.

15. The remote control device of claim 11 wherein said detachable component includes a key, said key operable to provide access to and operation of the vehicle.

16. A method for controlling a reduced operational mode of a vehicle comprising:
    communicating a first signal from a portable communication device based on the presence of a detachable component coupled to said portable communication device;
    communicating a second signal from said portable communication device based on the absence of said detachable component from said portable communication device;
    receiving at least one of said first and second signal by a receiver associated with the vehicle; and
    operating the vehicle in a reduced operational mode based on said receiver receiving said second signal wherein said reduced operational mode includes limiting RPM of a vehicle engine.

17. The method of claim 16 wherein operating the vehicle in a reduced operational mode also includes at least one of:
    inhibiting access to predetermined storage compartments in the vehicle;
    limiting speed of the vehicle;
    initiating a recording device for recording vehicle conditions while in said reduced operational mode, said vehicle conditions including at least one of vehicle mileage accumulation and engine run time;
    inhibiting customizable settings; and
    precluding operation of a vehicle audio system.

18. A remote control device for controlling a reduced operational mode of a vehicle comprising:
  a portable communication device operable to communicate with the vehicle; and
  a detachable component selectively coupled to said communication device, said communication device operable to initiate a reduced operational mode for the vehicle upon detachment of the detachable component from said communication device, wherein said portable communication device and said detachable component are independently capable of accessing and operating said vehicle in said reduced operational mode upon said detachment.

* * * * *